United States Patent
John et al.

(10) Patent No.: US 6,831,690 B1
(45) Date of Patent: Dec. 14, 2004

(54) ELECTRICAL SENSING APPARATUS AND METHOD UTILIZING AN ARRAY OF TRANSDUCER ELEMENTS

(75) Inventors: Scott-Thomas John, Ottawa (CA); Paul Hua, Nepean (CA); George Chamberlain, Kanata (CA)

(73) Assignee: Symagery Microsystems, Inc. (CA)

( * ) Notice: Subject to any disclaimer, the term of this patent is extended or adjusted under 35 U.S.C. 154(b) by 0 days.

(21) Appl. No.: 09/456,206

(22) Filed: Dec. 7, 1999

(51) Int. Cl.[7] .............................................. H04N 3/14
(52) U.S. Cl. ...................... 348/302; 348/281; 250/208.1
(58) Field of Search ......................... 378/98.8; 348/281, 348/302; 250/208.1

(56) References Cited

U.S. PATENT DOCUMENTS

| | | | |
|---|---|---|---|
| 5,153,731 A | 10/1992 | Nagasaki et al. | 358/213.11 |
| 5,382,920 A * | 1/1995 | Jung | 330/308 |
| 5,790,191 A | 8/1998 | Zhang | 348/300 |
| 5,892,540 A | 4/1999 | Kozlowski et al. | 348/300 |
| 5,917,547 A | 6/1999 | Merrill et al. | 348/301 |
| 5,920,274 A | 7/1999 | Gowda et al. | 341/155 |

FOREIGN PATENT DOCUMENTS

EP  0951178  5/2001  ............ H04N/3/15

OTHER PUBLICATIONS

"A 256 × 256 CMOS Imaging Array with Wide Dynamic Range Pixels and Column–Parallel Digital Output" Decker et al., *IEEE Journal of Solid–State Circuits*, vol. 33, No. 12, 1998, pp. 2081–2090.

* cited by examiner

*Primary Examiner*—Andrew Christensen
*Assistant Examiner*—Brian Genco
(74) *Attorney, Agent, or Firm*—Hayes Soloway P.C.

(57) ABSTRACT

Many electrical sensing devices include an array of transducer elements for converting external stimuli to electrical indications. Novel technologies to realize improvements in low power consumption, low noise, and analog output path which occupies minimal die area while maintaining certain data rates are disclosed. A two stage pipeline architecture of the invention in the analog output path maintains fast pixel rates with minimal ADC (analog digital converter) arrangement. A novel power supply and the use of differential amplifiers in connection with a black signal level as a reference voltage are also described.

32 Claims, 5 Drawing Sheets

ELECTRICAL SENSING APPARATUS AND METHOD UTILIZING AN ARRAY OF TRANSDUCER ELEMENTS

FIELD OF INVENTION

The invention generally relates to an electrical sensing apparatus and method utilizing an array of transducer elements. More particularly, it is directed to improvements in the analog output path of such an apparatus and method.

BACKGROUND OF INVENTION

One of the most common devices to include a sensor array is an image sensor, which has an array of pixels that convert optical signals into electrical analog signals. These analog signals must be transferred off chip, often after being converted into a digital signal. There are a number of problems associated with this process mainly involving limiting power consumption, noise, and die area while increasing the speed at which data can be conveyed off chip.

In addition to image sensors which involve conversion between optical signals and electrical signals, there are a large number of different sensing elements which require conversion of signals from one type to another type. Some examples of these are elements dealing with acoustic waves, electromagnetic waves including radio waves, IR, X-rays and others, mechanical properties and chemical properties. The conversion of these properties is generally performed by using transducers, detectors and sensors. Photodetectors, X-ray detectors, thermo-detectors, IR detectors, radiation detectors, capacitive sensors and the likes generate electrical analog signals in response to electromagnetic waves which impinge upon them. Acoustic detectors detect acoustic waves and generate electrical analog signals. Mechanical transducers, on the other hand, measure mechanical properties such as, strain, displacement, flatness, and others and often produce electrical signals.

In this specification, the invention is described in detail in connection with optical image sensors but it should be noted that the concept of the invention is equally applicable to other fields some of which are mentioned above.

Certain image sensor architectures consume a large amount of power. The addition of features such as analog to digital converters (ADC) made feasible by CMOS image sensor technology only serves to increase the power consumption. Noise is also a major concern. Fixed pattern noise (FPN) caused by non-uniformities in the sensor array and local signal path (i.e. imperfect matching of transistor properties across the die), capacitor noise, and switching noise must all be taken into consideration. The high resolution and fast scanning rates of today's imagers also cause the speed of the output path to become a significant issue. A number of factors combine to reduce the rate at which data can be transferred off chip. The large size of the array implies a need to drive long busses with large parasitic capacitances. As well, the small pixel size results in the column amplifiers being confined to a narrow pitch, and therefore having a small current driving capability.

Solutions to these concerns do exist but they usually result in a large die area penalty. If the die area occupied by the proposed solutions is too large, it will compromise the economic viability of the design.

In U.S. Pat. No. 5,892,540 Apr. 6, 1999 Kozlowski et al, low noise amplifiers for passive pixel CMOS imagers are described. It uses capacitive transimpedance amplifier with gain-setting feedback capacitors and selectable load capacitors.

Charge couple devices (CCD) and early CMOS image sensors did not integrate an ADC on chip. These devices produced an analog output voltage and therefore require an additional IC to perform the conversion to a digital signal. Extra IC's are costly and inhibit the miniaturization of camera systems.

The integration of ADCs is one of the key advantages of CMOS image sensor technology. There are a number of current techniques for implementing an integrated ADC. A single ADC per chip has a number of advantages in that it introduces little noise to the system and consumes less power than other techniques. The major advantage of this technique is the significant reduction in die area it offers in comparison to other configurations of integrated ADCs. However, a single ADC places a significant bottleneck in the output path which needs to be addressed in order for fast pixel rates to be maintained. The bottleneck issue becomes more prominent as array sizes continue to grow.

Column parallel ADCs are one solution to this bottleneck. By implementing one ADC per column, a large amount of data can be quickly digitized. However, column parallel ADCs result in an extremely large die area penalty. In fact, ADCs arranged in this manner can take up nearly as much die area as the sensor array itself. Column parallel ADCs also introduce a serious amount of noise to the system. Not only is the amount of switching noise increased, but also column to column noise is introduced by process variations between the different ADCs.

Yet another solution is the use of pixel level ADCs where an ADC is implemented as a part of each pixel cell. This solution has the advantages of high speed and a high signal to noise ratio. Unfortunately, this technology results in a large pixel size and low fill factor which limit the possible resolution of the sensor. As each pixel containing an ADC will logically consume more power than those that do not, arrays using pixel level ADC technology will be limited in size by their power consumption.

Followings are some prior art technologies dealing with CMOS imagers and problems associated with them. U.S. Pat. No. 5,920,274 Jul. 6, 1999 Gowda et al describes a column parallel ADC architecture employing non-uniform A/D conversion. U.S. Pat. No. 5,917,547 Jun. 29, 1999 Merrill et al, on the other hand, describes a two-stage amplifier for active pixel sensor cell array for reducing fixed pattern noise in the array output.

The present invention addresses above-mentioned difficulties of the prior art technologies. It provides a novel electrical sensing apparatus and method which are characterized in a low power, low noise, and analog output path which occupies minimal die area while maintaining certain data rates. If a product design requires ADCs, the invention ensures a minimal number of ADCs in the output path and this vastly reduces the power consumption and switching noise on the device as well as having notable die area benefits. A two stage pipeline architecture of the invention maintains fast pixel rates with this minimal ADC arrangement.

The two stage pipeline architecture without the use of ADCs can be also implemented in a device where analog outputs off chip are desired. The pipelining signals from the first stage amplifiers in this implementation realizes similar benefits to those mentioned above.

SUMMARY OF INVENTION

Briefly stated, in accordance with one aspect, the invention is directed to an electrical sensor apparatus which comprises an array of transducer elements, each transducer element producing an electrical indication in response to an external stimulus incident thereon and a plurality of first stage amplifiers connected to the array of transducer elements for transferring the electrical indications to a plurality of second stage amplifiers by way of a plurality of data bus lines, and the plurality of second stage amplifiers generate outputs indicative of the external stimuli. In the apparatus, each data bus line requires a predetermined duration of time to settle during each transfer and the plurality of first stage amplifiers drive the data bus lines cyclically so that each data bus line is driven at least once with an interval between two successive bus drives being at least the predetermined duration of time.

According to another aspect, the invention is directed to a method of generating electrical signals from an array of transducer elements, each producing an electrical indication in response to an external stimulus incident thereon. The method comprises steps of sampling the array of transducer elements in a first predetermined sequence to read the electrical indications out to a plurality of first stage amplifiers and driving in a second predetermined sequence a plurality of data bus lines to transfer data corresponding to the electrical indications from the first stage amplifiers to a plurality of second stage amplifiers, each data bus line requiring a predetermined duration of time to settle for each transfer. The method further includes a step of generating the electrical signals indicative of the external stimuli, in that each data bus line is driven at least once for transfer of the data with an interval between successive transfers being at least a predetermined duration of time.

DETAILED DESCRIPTION OF PREFERRED EMBODIMENTS OF INVENTION

In one embodiment, a first stage amplifier exists for each column in the sensor array. These first stage amplifiers sample the data from the array while preferably having special noise and power reduction characteristics. The data is buffered by the first stage amplifiers until it is clocked onto a data bus in a pipeline fashion where it is sampled by the second stage amplifier. Each data line of the bus is coupled to an individual second stage amplifier. This second amplifier stage is not constrained by pitch and therefore can have a large drive capability. The second stage amplifiers will sequentially drive pixel data to the ADC while the others are sampling. Using this pipeline architecture, there will be a slight delay for the initial pixel data to reach the ADC but from that point on, a new pixel will arrive at the ADC with every clock cycle.

Figure 1:
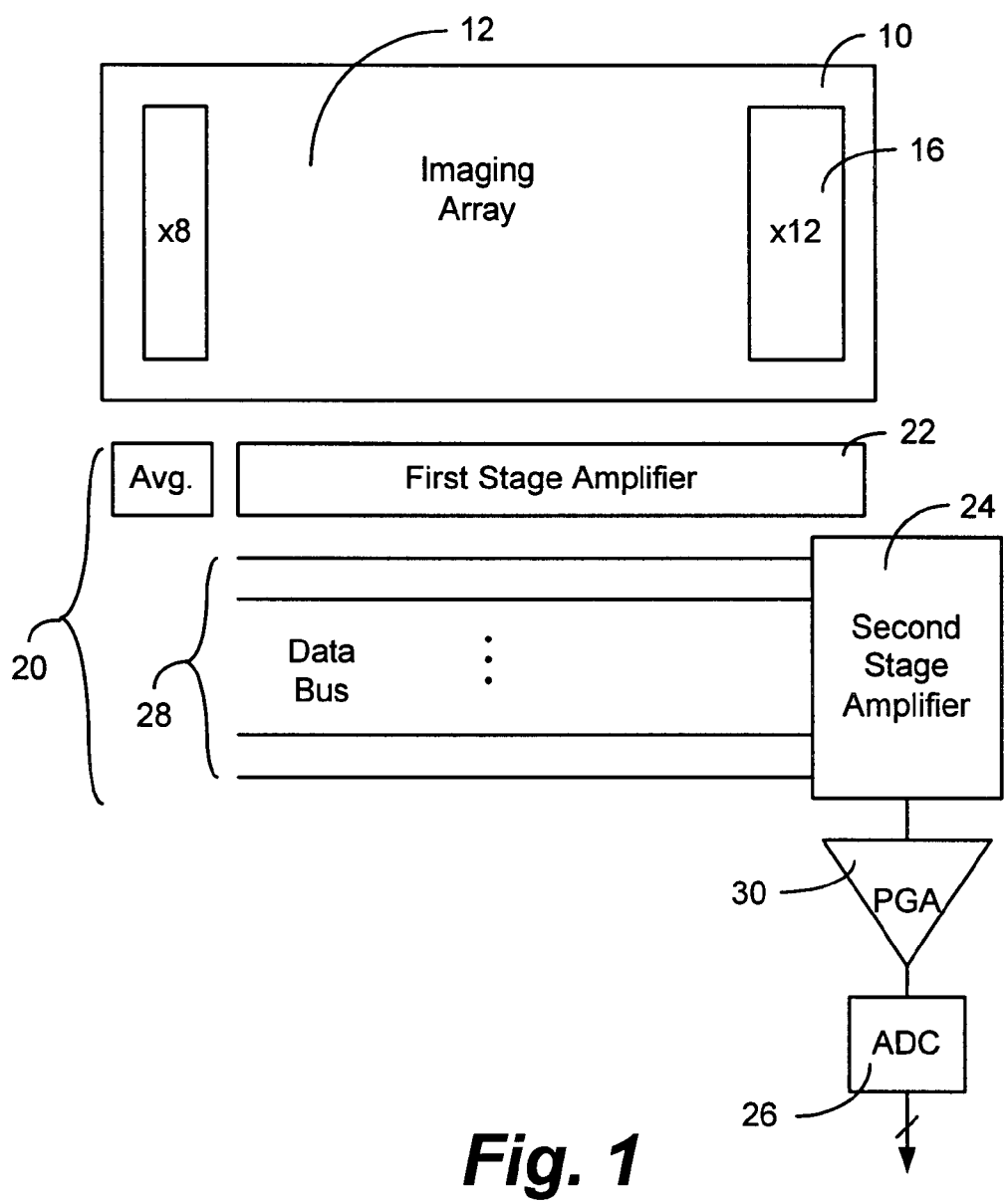
FIG. 1 is a block diagram of the sensor array and analog output path.

Referring to FIG. 1, there is shown a block diagram of the sensor array and analog output path according to an embodiment of the invention. The sensor array 10 consists of an (s×t) matrix 12 (where s is the number of rows and t is the number of columns) of active pixel sensors (APS) cells as well as two other optional matrices 14 and 16 of sensors which are optically shielded to provide dark current calibration. The analog output path 20 comprises two sets of amplifiers 22 and 24 organized as a two stage pipeline and a minimal number of analog to digital converters (ADC) 26. Data bus 28 connects the first and second stage amplifiers. The data bus consists of a plurality of equal length data lines. A programmable gain amplifier (PGA) 30 can optionally be included between the second stage amplifiers and each ADC. The preferable number of ADCs is one although by dividing the array into a minimal number of sections, several output paths or taps as they are known in the art could each make use of the invention according to another embodiment. Prior to being output from the device, the multiple taps could be multiplexed together to create a single output. The use of the invention for a system utilizing more than one tap should be obvious to those skilled in the art and will not be outlined in detail.

A single ADC occupies a much smaller die area than the alternative schemes such as column parallel ADC where each column is provided with its own ADC. In addition, a single ADC generates much less switching noise and consumes much less power than an entire row of such circuitry. Another benefit of using a single ADC is that any noise that introduced to the system by this circuit is universal to all the data being transferred from the sensor. This makes it quite simple to correct for this noise off chip.

As mentioned earlier, the single ADC ordinarily acts as a bottleneck in the output data path. To overcome this problem and maintain the desired pixel rate, a high speed architecture is required which can provide data to the ADC at an expedited rate. Using known techniques, one pixel would have to pass along the output path from the sensor array to the ADC prior to the next pixel being accessed. This is an extremely slow process. According to an embodiment of the invention, a pipeline architecture prior to the ADC is used which divides the output path into a number of stages. Therefore, the pixel access time is multiplexed in time and it is also divided among the stages.

Each column of the array has its own first stage amplifier which is known as a column amplifier. The column amplifiers sample and buffer the pixel data in a manner that will be described later, prior to it being clocked in a pipeline fashion onto the data bus. The individual lines that comprise the bus are of equal length and run along the entire side of the array so that the parasitic capacitance seen by each amplifier is equalized. Each line is coupled to a separate second stage amplifier. Once the pixel data is buffered in the column amplifiers, it can be pipelined onto the data bus. On the first clock cycle, pixel data from the first column is driven onto the first data bus line. With the second clock cycle, pixel data from the second column is driven onto the second data bus line and so on until data has been driven onto the final data bus line. The data will take a certain amount of time to settle on each data bus line, at which point it can be sampled (read) by the second stage amplifier. Once the first pixel has been sampled from a data bus line, a new pixel can be placed on that line. This means that the number of data bus lines in the bus is dependent on the settling time and the clock period. For example, if it takes 420 ns for a driven data bus line to settle at a particular level and the clock period is 20 ns, then 21 data bus lines are required. To stay with this example, once pixel data from the 21st column has been driven onto the 21st data bus line, the next clock cycle would result in pixel data from the 22nd column being driven onto the first data bus line. This will prevent the data from being corrupted because by the 22nd clock cycle over 420 ns has elapsed and the first pixel data has had time to settle on the data bus line and be sampled by the second stage amplifier.

It should be noted that there may also be further constraints placed on the number of data bus lines making up the bus by extra functionality included in the device. For example, sub-sampling allows pixel data corresponding to an image to be sent off chip very quickly simply due to the fact that the amount of data is reduced by half or some other fraction. This results in reduced image quality but this trade off is acceptable for some applications such as providing an image to a viewfinder. Sub-sampling is not to be confused with a variety of sampling techniques which will be described later in this specification, e.g., single sampling, double sampling or correlated double sampling of sensing elements. Sub-sampling, on the other hand, refers to sampling of a fraction of pixels, thus resulting in a reduced amount of data being sent off chip. Some examples are described in detail below.

For this pipeline scheme to support column sub-sampling where only every second column is sampled and is allowed to drive an associated data bus line, the number of data bus lines would have to be an odd number. This is to ensure that each data bus line has time to settle and be sampled by the second stage amplifier prior to new pixel data being driven onto the line. The process is very similar to that explained previously. On the first clock cycle, the first column is driven onto the first data bus line. On the second clock cycle, the third column is driven onto the third data bus line and so on. If there were an even number of data bus lines, say twenty, the pattern of data bus lines being driven would be 1, 3, 5, 7, ... 17, 19, 1, 3 ... which means that the first data bus line would be driven for a second time long before the initial data had a chance to settle. However, with an odd number of lines, the pattern of data bus lines being driven would be 1, 3, 5, 7, ... 17, 19, 21, 2, 4, 6 ... 18, 20, 1, 3 ... which means that the first data bus line is not driven for a second time until the twenty second clock cycle. This gives each line enough time to settle and be sampled by the second stage amplifier.

Instead of sampling every other column, every n-th column can be sampled, n being 3 or larger in another embodiment. For certain applications this reduced resolution may be tolerable and the speed may outweigh such a disadvantage. For the lack of a proper term, these techniques of sub-sampling are called a "viewfinder mode" in this specification. The total number of data bus lines is dictated by the following two factors (1) The minimum number of data bus lines is set by dividing the settling time of a single data bus line by the clock period.

(2) The exact number of data bus lines is dependent on the type of sub-sampling that is required. The number of data bus line=p*m+1≧settling time/clock period, where p is any positive integer and every m-th column is sampled.

For example, if the settling time for one data bus line is 420 ns, the clock period is 20 ns, and every 6-th column is sampled:

The number of data bus lines=6 m+1≧420 ns/20 ns, therefore, p=4 and 25 data bus lines are required.

The data from the second stage amplifiers is clocked out in a sequential fashion. By the time the last second stage amplifier is clocked out, new data is ready to be sent by the first second stage amplifier. The data line between the second stage amplifiers and the ADC or optional PGA is very short and therefore has a low parasitic capacitance. In addition, the second stage amplifiers have a large current driving capacity because they are not constrained by pitch. This means that only one clock cycle is required to drive the data from one second stage amplifier to the ADC or PGA. Therefore, new pixel data is provided to the ADC or PGA with every clock cycle.

It should be noted that the description in this specification deals mainly with embodiments which include ADCs. It should be clear to those skilled in the art that analog output signals are in some cases desired and it is possible to design the sensor without the used of ADCs. In yet another instance, the sensor can include ADCs but can selectably provide analog and/or digital outputs.

Figure 2:
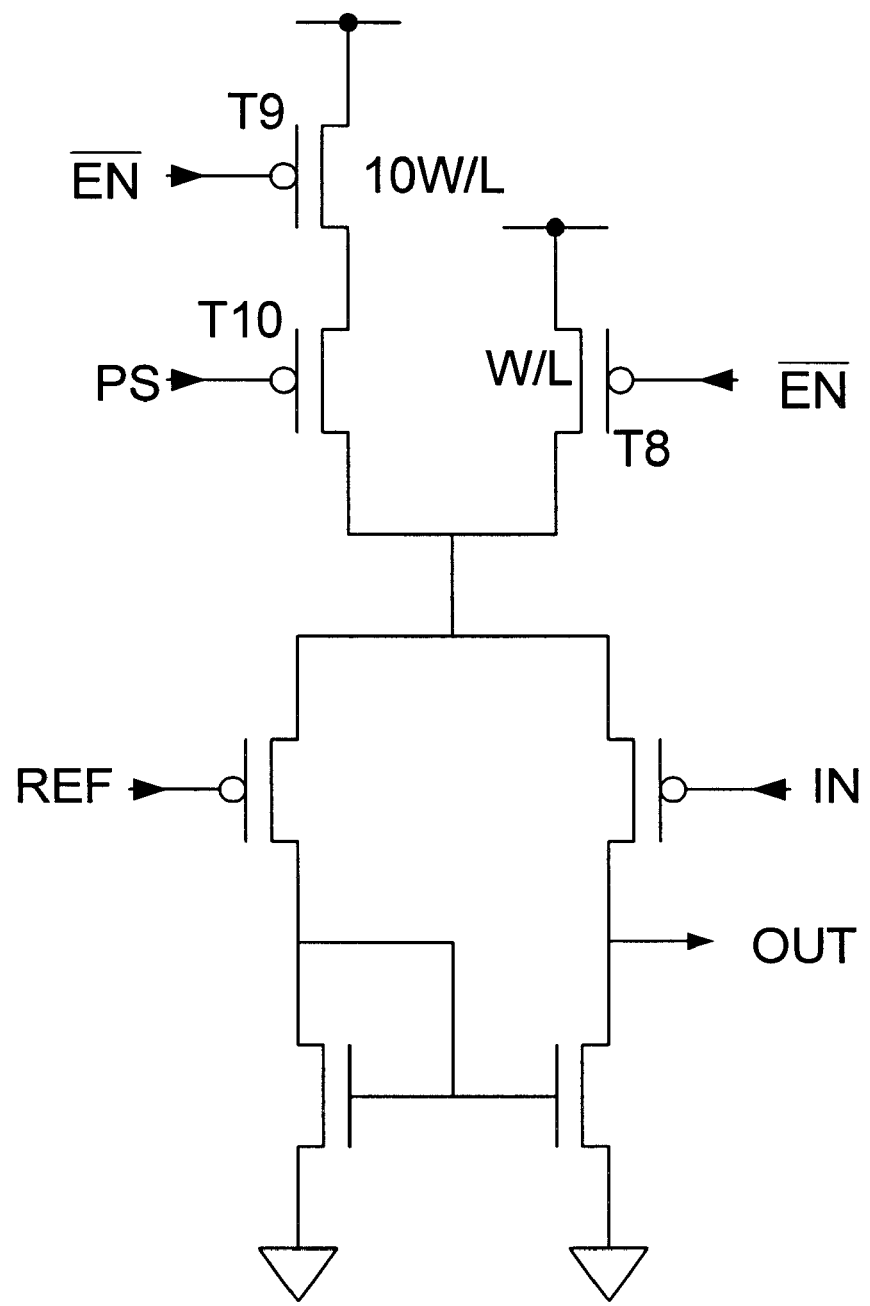
FIG. 2 is a circuit diagram of the first stage amplifier illustrating its ability to switch between a low power consumption mode and a current driving mode.

The pipeline process could consume a large amount of power if all of the column amplifiers were to remain enabled until all of the data has been passed to the second stage. However, according to another embodiment, the current consumption of the column amplifiers is reduced once the data has been sampled and buffered. When it comes time to drive data from that column onto the data bus, the current consumption is increased to enhance the drive capabilities. FIG. 2 illustrates one possible arrangement of reducing the current driving capability of the column amplifier. According to this embodiment, the current source of the amplifier consists of three transistors arranged in two parallel branches. The first branch consists of transistor T8 while the second branch consists of transistors T9 and T10 in series. T8 and T9 are biased as current sources with T9 being significantly wider (i.e. larger drive) than T8. T10 acts like a switch that when off results in an amplifier that remains biased but has low driving capabilities.

The first stage amplifier serves to sample and buffer the pixel data. There are many type of amplifier configurations available. Two of the most commonly used for this particular application are a source follower and a differential amplifier. The source follower has the advantage of speed but suffers from a lack of consistent gain between columns. It also does not offer the power consumption advantages of a differential amplifier. With either of these types of amplifiers, a number of sampling techniques are commonly used including single sampling, double sampling, and correlated double sampling. Single sampling involves the readout of the pixel at the end of the integration time. Double sampling produces the difference between the signal at the end of integration and at the ensuing reset level. This technique is capable of suppressing any non-uniformities in the local signal path. Correlated double sampling takes the difference between the signal at the end of integration and its reset level prior to integration. Any of these techniques and amplifier circuits can be used with the pipeline output path of the present invention.

High resolution requires a large sensor array and/or small pixels. Small pixel size results in the column amplifiers being constrained by pitch. This puts a practical limit on drive capability and produces an increased susceptibility to process variations. Process variations lead to non-uniform DC offsets (for differential amplifier configurations) and gain in the column amplifiers. These non-uniformities can impart the image with a time invariant offset pattern know as fixed pattern noise (FPN). In order to produce a high quality image, this pattern should be removed by subtracting a reference image. The subtraction process can be performed by using readout techniques such as double sampling or signal processing techniques which require a memory equal in size to the image. Another preferred embodiment of the invention utilizes a certain first stage amplifier to compensate for these concerns.

Figure 3:
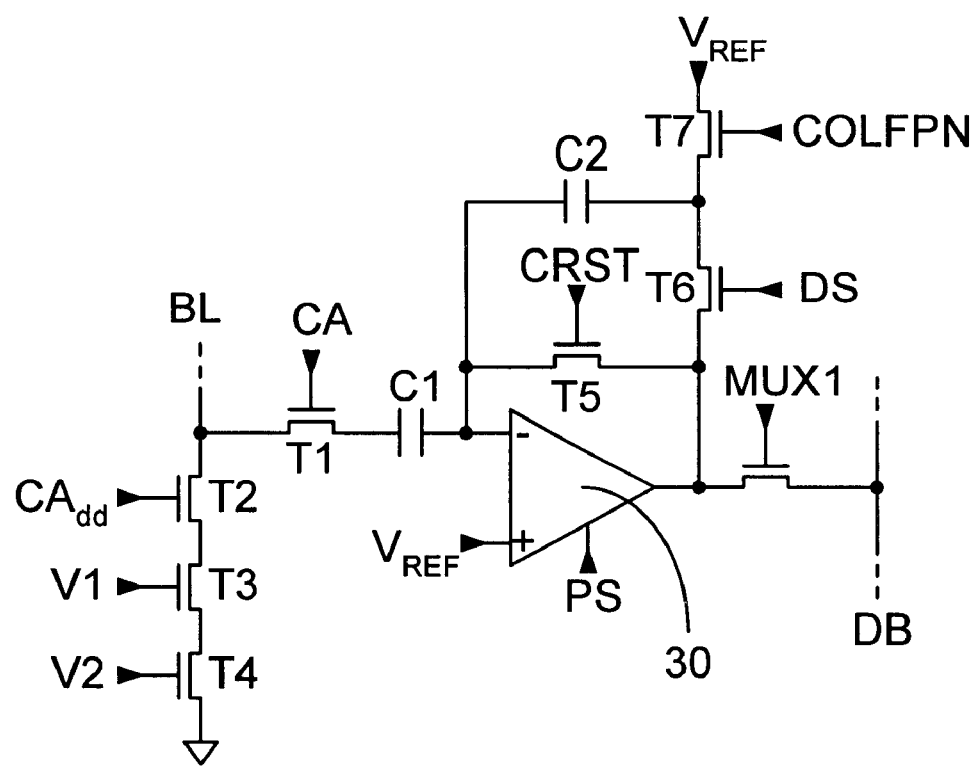
FIG. 3 is a circuit diagram of the first stage amplifier.

This preferred embodiment of the invention employs double sampling using the differential column amplifier detailed in FIG. 3. In FIG. 3, transistors T2, T3, and T4 are connected in series between the column line BL and ground to serve as a current source for the source follower of the cell. The gates of T3 and T4 are coupled to reference voltages V1 and V2 respectively while the gate of T2 is coupled to a delayed column address signal (CAdd), which will be described below. Column access transistor T1 and capacitor C1 are connected in series between the column line BL and the inverting input of an operational amplifier 30. The gate of T1 is coupled to a column address signal CA. The operational amplifier 30 is connected with a negative feedback loop consisting of capacitor C2 and transistors T5, T6, and T7.

Figure 4:
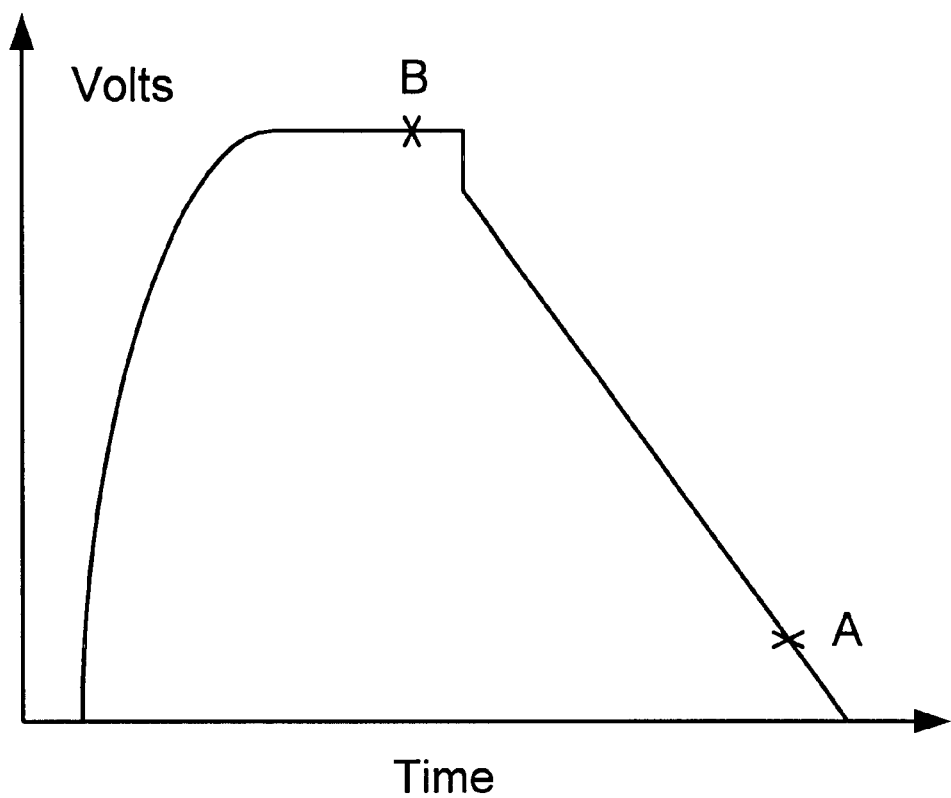
FIG. 4 is a graph of the voltage response of a sensor cell during integration.

The voltage curve of the photo diode of each pixel with respect to integration time is illustrated in FIG. 4. The first sample is taken at point A on the curve which represents the voltage discharged by the photo diode due to its response to optical stimulus. The second sample is taken at point B once the cell has been reset. Of note is the voltage drop caused by the feed through of the reset clock rather than the optical response of the cell.

At the time of the first sample, T5 is turned on by the high level of CRST, T6 is turned off by a low value of DS, and T7 is turned on by the high value of COLFPN. Therefore, when the column access transistor T1 is turned on, charge proportional to the pixel data is stored on C1 while charge proportional to the dc offset voltage of the operational amplifier is stored on C2. At this point, T5 and T7 are turned off by CRST and COLFPN going low and the row of cells is reset. Once this has occurred, T6 is turned on by DS going high. This places a voltage across C1 that is equivalent to the difference between A and B. At this point CA goes low, turning off the column access transistor T1. If the current source consisting of T2, T3, and T4 were allowed to remain on, the resulting low voltage on the column line could cause sub-threshold leakage across T1. To account for this, T2 is turned off by CAdd. However, turning off T2 prior to T1 can also effect the voltage across C1, as the column line will be pulled up by the cell. Therefore, CAdd must be a delayed version of CA.

A voltage proportional to the difference between A and B is now buffered by the amplifier. By taking this difference, any noise accountable to a non-uniform sensor array or clock feed through in the cell is removed. The charge stored on C2 removes the effect of the dc offset voltage of the operational amplifier. The amplifier output voltage will then be sequentially clocked onto the data bus connecting the first and second stage amplifiers. While the column amplifier is driving a data line, it needs a relatively large current driving capability. However, prior to the data being clocked out, the current driving capability of the amplifier can be reduced. This results in great power savings. Then, when the amplifier is selected to drive a data line, the current driving capability can again be increased.

Figure 5:
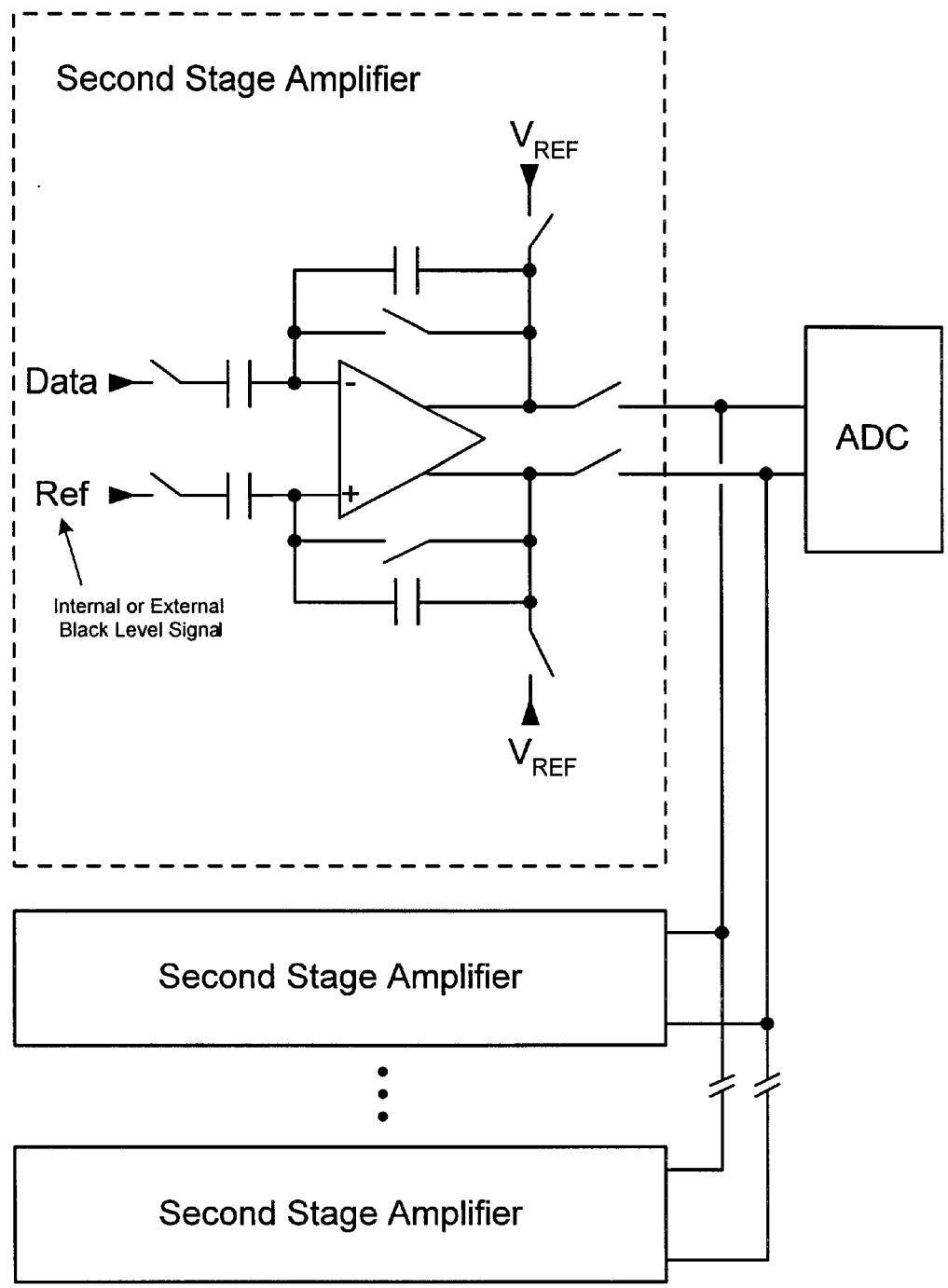
FIG. 5 is a circuit diagram of the second stage amplifier which also illustrates the multiplexing between the second stage amplifier and the PGA.

Other possible embodiments of the invention revolve around the second stage amplifiers. Again, these can be implemented using source followers, differential amplifiers, or a number of other amplification circuits without affecting the operation of the pipeline output path. A preferred embodiment is a differential amplifier as illustrated in FIG. 5 which compares the pixel data to a reference voltage such as a black level signal either generated internally or provided externally. This would allow the second stage amplifiers the option of compensating for dark current effects in the sensor array. Dark current is a result of excess electrons created in the sensor array from impurities, material boundaries, and proton irradiation that are impossible to distinguish from electrons created by the conversion of photons by the pixels. Unfortunately, dark current is not uniformly distributed over the array which leads to another source of offset in the image. It is not possible to correct for dark current by double sampling. The only effective technique is to subtract a reference black signal level from the pixel data. Therefore, the embodiment incorporating dark current compensation is very beneficial to producing a high quality image.

It should be noted that while the dark current compensation is described in detail in connection with the second stage amplifiers, some compensation arrangements similar to that described above can be employed at any stage, including the first amplifier stage. In fact, the first stage amplifier shown in FIG. 3 includes a differential amplifier to which a Vref is applied. A black level signal can be incorporated to any other compensation signals to be used as Vref.

There are many other possible applications that require an electronic signal to be transferred from an array of transducer elements. These might include pressure sensors comprised of an array of micromachined springs or bio sensors that convert a biological process to an electrical signal.

What we claim as our invention is:

1. An electrical sensor apparatus comprising:
   an array of transducer elements arranged in a (s×t) matrix where s is the number of rows and t is the number of columns, each transducer element adapted to produce an electrical indication in response to external stimuli incident thereon;
   a plurality t of first stage amplifiers, each first stage amplifier connected to a column of transducer elements;
   a plurality u of data bus lines, each of the data bus lines requiring a substantially similar predetermined duration of time d to settle during a transfer of an electrical indication to the data bus line, wherein:

$t > (n * u)$, where n is a positive integer and every u-th first stage amplifier is connected to the same data bus line, and wherein minimum u is determined by the formula:

$u = d/T$, wherein d is the settling time of a single data bus line and where T is a clock period;
   a plurality u of second stage amplifiers for generating outputs indicative of the external stimuli; each second stage amplifier being connected to a data bus line; and
   the plurality t of first stage amplifiers being adapted to drive the data bus lines cyclically so that each data bus line is driven at least once, with an interval between two successive bus drives being at least the predetermined duration of time d.

2. The electrical sensor apparatus according to claim 1 wherein for sub-sampling of every m-th first stage amplifiers, u is determined by the following formulae:

$u = p * m + 1 \geq$ minimum $u$, wherein p is any positive integer.

3. The electrical sensor apparatus according to claim 1, wherein the first and second stage amplifiers are in either one of the following configurations, a source follower or a differential amplifier, the first stage amplifiers having associated capacitors for sampling and buffering the amount of charge proportional to the electrical indications of the external stimuli.

4. The electrical sensor apparatus according to claim 2, wherein the first and second stage amplifiers are in either one of the following configurations, a source follower or a differential amplifier, the first stage amplifiers having associated capacitors for sampling and buffering an amount of charge proportional to electrical indications of the external stimuli and different first stage amplifiers distributed at regular intervals driving respective data bus lines successively, a period between two successive transfers on each data bus line being at least a predetermined duration of time.

5. The electrical sensor apparatus according to claim 3, further comprising a variable current source for supplying two or more current levels to the first stage amplifiers in response to modes of operation of the first stage amplifiers.

6. The electrical sensor apparatus according to claim 4, further comprising a variable current source for supplying two or more current levels to the first stage amplifiers in response to modes of operation of the first stage amplifiers.

7. The electrical sensor apparatus according to claim 3, wherein each first stage amplifier comprises a switch for controlling a current source of each column of transducers to prevent leakage of charge buffered in the associated capacitor.

8. The electrical sensor apparatus according to claim 4, wherein each first stage amplifier comprises a switch for controlling a current source of each column of transducers to prevent leakage of charge buffered in the associated capacitor.

9. The electrical sensor apparatus according to claim 5, wherein the variable current source comprises two branches and a switch for switching between the branches to provide more power while sampling a column or driving a data bus line and less power during the other mode of operation.

10. The electrical sensor apparatus according to claim 9, wherein either one or both of the first and second stage amplifiers include a black level signal as a reference voltage.

11. The electrical sensor apparatus according to claim 10, further comprising one or both of the following, an ADC or PGA, connected to the second stage amplifiers to which the second stage amplifiers provide an output indicative of the external stimuli.

12. The electrical sensor apparatus according to claim 6, wherein the variable current source comprises two branches and a switch for switching between the branches to provide more power while sampling a column or driving a data bus line and less power during the other mode of operation.

13. The electrical sensor apparatus according to claim 12, wherein either one or both of the first and second stage amplifiers include a black level signal as a reference voltage.

14. The electrical sensor apparatus according to claim 13, further comprising one or both of the following, an ADC or PGA, connected to the second stage amplifiers to which the second stage amplifiers provide an output indicative of the external stimuli.

15. The electrical sensor apparatus according to claim 7, wherein the switch is connected to the current source and is operable in a predetermined time delayed relationship with the sampling by the first stage amplifiers.

16. The electrical sensor apparatus according to claim 15, wherein each first stage amplifier comprises further a dc offset capacitor for storing charge proportional to a dc offset voltage and a switched circuit operable in response to the resetting of transducers so that the amount of charge buffered in the associated capacitor represents either double sampling or correlated double sampling of each transducer.

17. The electrical sensor apparatus according to claim 16, wherein either one or both of the first and second stage amplifiers include a black signal level as a reference voltage.

18. The electrical sensor apparatus according to claim 17, comprising further one or both of the following, an ADC or PGA, connected to the second stage amplifiers to which the second stage amplifiers provide an output indicative of the external stimuli.

19. The electrical sensor apparatus according to claim 8, wherein the switch is connected to the current source and is operable in a predetermined time delayed relationship with the sampling of the first stage amplifiers.

20. The electrical sensor apparatus according to claim 19, wherein each first stage amplifier comprises further a dc offset capacitor for storing charge proportional to a dc offset voltage and a switched circuit operable in response to the resetting of transducers so that an amount of charge buffered in the associated capacitor represents either double sampling or correlated double sampling of each transducer.

21. The electrical sensor apparatus according to claim 20, wherein either one or both of the first and second stage amplifiers include a black signal level as a reference voltage.

22. The electrical sensor apparatus according to claim 21, comprising further one or both of the following, an ADC or PGA, connected to the second stage amplifiers to which the second stage amplifiers provide an output indicative of the external stimuli.

23. The electrical sensor apparatus according to claim 11, wherein the transducer elements are one selected from a group consisting of CMOS optical elements, capacitive sensors, mechanical transducers, acoustic transducers, electromagnetic wave transducers and the external stimulus is one of the following visible or invisible light, including IR and thermal rays, radio waves, X-rays, acoustic waves, mechanical stimuli consisting of any of the following, pressure, mechanical strain, and dislocation.

24. The electrical sensor apparatus according to claim 14, wherein the transducer elements are one selected from a group consisting of CMOS optical elements, capacitive sensors, mechanical transducers, acoustic transducers, electromagnetic wave transducers and the external stimulus is one of the following visible or invisible light, including IR and thermal rays, radio waves, X-rays, acoustic waves, mechanical stimuli consisting of any of the following, pressure, mechanical strain, and dislocation.

25. The electrical sensor apparatus according to claim 18, wherein the transducer elements are one selected from a group consisting of CMOS optical elements, capacitive sensors, mechanical transducers, acoustic transducers, electromagnetic wave transducers and the external stimulus is one of the following visible or invisible light, including IR and thermal rays, radio waves, X-rays, acoustic waves, mechanical stimuli consisting of any of the following, pressure, mechanical strain, and dislocation.

26. The electrical sensor apparatus according to claim 22, wherein the transducer elements are one selected from a group consisting of CMOS optical elements, capacitive sensors, mechanical transducers, acoustic transducers, electromagnetic wave transducers and the external stimulus is one of the following visible or invisible light, including IR and thermal rays, radio waves, X-rays, acoustic waves, mechanical stimuli consisting of any of the following, pressure, mechanical strain, and dislocation.

27. The electrical sensor apparatus according to claim 1, further comprising at least one additional amplifier stage connected to the plurality of the second stage amplifiers for generating output indicative of the external stimuli, each of the at least one additional amplifier stage comprising at least one amplifier.

28. An electrical sensor apparatus comprising:

an array of transducer elements arranged in a plurality t of groups where each transducer element is adapted to produce an electrical indication in response to external stimuli incident thereon;

a plurality t of first stage amplifiers connected to the plurality of groups of transducer elements for receiving the electrical indications from each of the transducer elements;

a number u of second stage amplifiers for generating outputs indicative of the external stimuli;

a number u of data bus lines coupled to the number u of second stage amplifiers for transferring the electrical indications from the first stage amplifiers to the second stage amplifiers; wherein the data bus lines exhibit a substantially similar time d for an electrical indication to settle, and the minimum number u of data bus lines is determined by the settling time d in accordance with the formula:

$$u \geq d/T,$$

where T is a clock period for passing one of the electrical indications from one of the first stage amplifiers to one of the data bus lines.

29. The electrical sensor apparatus according to claim 28, wherein, for sub-sampling of every m-th first stage amplifiers, u is determined by the following formulae:

$$u = p*m + 1 \geq \text{minimum } u,$$

where p is any positive integer.

30. The electrical sensor apparatus according to claim 28 wherein the transducer elements are arranged in an (s×t) matrix having s rows and t columns, each column forming one of the plurality of groups of transducer elements and each column coupled to one of the plurality of first stage amplifiers.

31. The electrical sensor apparatus according to claim 30, wherein u is determined by the following formula:

$$t \geq (n*u)$$

where n is a positive integer and every u-th first stage amplifier is connected to the same data base line.

32. The electrical sensor apparatus according to claim 28 wherein the data bus lines are substantially of equal length.

* * * * *

UNITED STATES PATENT AND TRADEMARK OFFICE
CERTIFICATE OF CORRECTION

PATENT NO. : 6,831,690 B1
DATED : December 14, 2004
INVENTOR(S) : Scott-Thomas et al.

It is certified that error appears in the above-identified patent and that said Letters Patent is hereby corrected as shown below:

Title page,
Item [12], should read -- Scott-Thomas et al. --
Item [75], Inventors, first named inventor should be -- John Scott-Thomas --.

Signed and Sealed this

Fifth Day of April, 2005

JON W. DUDAS
*Director of the United States Patent and Trademark Office*